(12) United States Patent
Kasaiezadeh Mahabadi et al.

(10) Patent No.: US 12,280,789 B2
(45) Date of Patent: Apr. 22, 2025

(54) ARCHITECTURE AND METHODOLOGY FOR VEHICLE MOTION CONTROL HEALTH MONITORING AND MITIGATION

(71) Applicant: GM Global Technology Operations LLC, Detroit, MI (US)

(72) Inventors: SeyedAlireza Kasaiezadeh Mahabadi, Novi, MI (US); Arun Adiththan, Sterling Heights, MI (US); Qingrong Zhao, Troy, MI (US); Wen-Chiao Lin, Rochester Hills, MI (US); Shiming Duan, Ann Arbor, MI (US); Ramesh Sethu, Troy, MI (US); Bakhtiar B. Litkouhi, Washington, MI (US); Shih-Ken Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 427 days.

(21) Appl. No.: 17/592,024

(22) Filed: Feb. 3, 2022

(65) Prior Publication Data
US 2023/0242131 A1 Aug. 3, 2023

(51) Int. Cl.
*B60W 50/02* (2012.01)
*B60W 40/10* (2012.01)

(52) U.S. Cl.
CPC ........ *B60W 50/0205* (2013.01); *B60W 40/10* (2013.01); *B60W 2050/021* (2013.01); *B60W 2050/0215* (2013.01)

(58) Field of Classification Search
CPC ............. B60W 50/0205; B60W 40/10; B60W 2050/021; B60W 2050/0215; B60W 50/04; B60W 50/00; B60W 50/045; B60W 2050/0005; G06Q 10/06311; G06Q 50/40; G06Q 10/20
See application file for complete search history.

(56) References Cited

U.S. PATENT DOCUMENTS

| | | | |
|---|---|---|---|
| 2007/0005202 A1* | 1/2007 | Breed | G07C 5/008 |
| | | | 714/25 |
| 2021/0116256 A1* | 4/2021 | Konrardy | G06Q 50/265 |
| 2022/0258751 A1* | 8/2022 | Dane | H04W 4/48 |
| 2023/0166722 A1* | 6/2023 | Hajiloo | B60W 30/02 |
| | | | 701/36 |

* cited by examiner

Primary Examiner — Sihar A Karwan
(74) Attorney, Agent, or Firm — Vivacqua Crane, PLLC

(57) ABSTRACT

A motor vehicle motion control health monitoring system includes sensors and actuators disposed on the motor vehicle. The sensors measure real-time static and dynamic telemetry data about the motor vehicle, and the actuators alter static and dynamic behavior of the motor vehicle. A control module has a processor, a memory, and input/output (I/O) ports. The processor executes program code portions stored in the memory, the program code portions include: an offline portion that collects telemetry data from the motor vehicle, performs failure analysis on the telemetry data and allocates tasks based on the failure analysis; and an online portion that analyzes the telemetry data for failures within specific sensors, actuators, or functions that utilize systems of sensors and/or actuators. The online portion mitigates deviations in the telemetry data by sending a correction to the one or more sensors, actuators, and/or functions of a motor vehicle motion control system.

18 Claims, 3 Drawing Sheets

ARCHITECTURE AND METHODOLOGY FOR VEHICLE MOTION CONTROL HEALTH MONITORING AND MITIGATION

INTRODUCTION

The present disclosure relates to systems and method for vehicle motion control, and more specifically to systems and methods for managing performance of vehicle motion control.

Motor vehicle motion control systems manage vehicle performance in longitudinal and lateral acceleration, pitch, roll, and yaw in a wide variety of ambient and road surface conditions. Such motor vehicle motion control systems are complex with large numbers of functions interacting with one another. Potential degradation in performance or even failure of a function may therefore propagate to other functions and result in deterioration of system performance or even failure of the system.

Accordingly, while current motor vehicle motion control systems achieve their intended purpose, there is a need for new and improved systems and methods for motor vehicle motion control management which reduce the burden on computational resources, increase reliability and robustness and redundancy of the system, provide a means to mitigate deterioration of system components and failures while maintaining or reducing cost and complexity, and which improve motor vehicle motion control.

SUMMARY

According to several aspects of the present disclosure a motor vehicle motion control health monitoring system includes one or more sensors disposed on the motor vehicle. The one or more sensors measure real-time static and dynamic telemetry data about the motor vehicle. The system further includes one or more actuators disposed on the motor vehicle, the one or more actuators altering static and dynamic behavior of the motor vehicle. A control module of the system has a processor, a memory, and input/output (I/O) ports in communication with the one or more sensors and the one or more actuators. The control module executes program code portions stored in the memory, the program code portions include an offline program code portion that collects telemetry data from the motor vehicle, performs failure analysis on the telemetry data and allocates tasks based on the failure analysis, and an online program code portion that analyzes the telemetry data for failures within specific sensors and/or actuators and/or functions that utilize systems of sensors and/or actuators and mitigates deviations in the telemetry data by sending a correction to the one or more sensors, actuators, and/or functions of a motor vehicle motion control system.

In another aspect of the present disclosure, the offline program code portion further includes a first program code portion that collects, via the I/O ports, the real-time static and dynamic data from the one or more sensors, from the one or more actuators, and from one or more functions of a motor vehicle motion control system.

In another aspect of the present disclosure, the offline program code portion further includes a second program code portion that performs failure mode determination for the one or more sensors, the one or more actuators, and the one or more functions. The failure mode determination includes determining whether one or more sensors, one or more actuators and/or one or more functions is experiencing a degradation of performance, a complete failure, and/or a failure mode in which the telemetry data includes noise beyond a predefined threshold noise value.

In another aspect of the present disclosure the offline program code portion further includes a third program code portion that performs data preparation, generation, and collection for the one or more sensors, the one or more actuators, and the one or more functions. The data preparation further includes: exclusion, filtering, and/or buffering processes.

In another aspect of the present disclosure, the offline program code portion further includes a fourth program code portion that utilizes a machine-learning architecture design to generate a task allocation scheme for the telemetry data from the one or more sensors, the one or more actuators, and the one or more functions. The machine-learning architecture further includes: machine-learning and/or artificial intelligence based clustering methods to identify failure modes and classifications. The fourth program code portion further applies a temporary or short-term mitigation to the one or more sensors, the one or more actuators, and/or the one or more functions and sending raw telemetry data to a cloud computing system for further analysis In another aspect of the present disclosure the online program code portion further includes a fifth program code portion that performs data exclusion on the telemetry data from the one or more sensors, the one or more actuators, and the one or more functions.

In another aspect of the present disclosure the online program code portion further includes sixth program code portion that detects and predicts potential failures within the one or more sensors, the one or more actuators, and the one or more functions.

In another aspect of the present disclosure the online program code portion further includes a seventh program code portion that communicates, via the I/O ports, the telemetry data from the one or more sensors, the one or more actuators, and the one or more functions between the motor vehicle and a I/O ports of a remote control module within a cloud computing system physically separate from the motor vehicle.

In another aspect of the present disclosure the online program code portion further includes an eighth program code portion that mitigates deviations in the telemetry data from the one or more sensors, the one or more actuators, and the one or more functions by applying a modified estimator algorithm and/or altered calibration correction to the one or more sensors, the one or more actuators, and the one or more functions.

In another aspect of the present disclosure a method for motor vehicle motion control system health monitoring includes measuring real-time static and dynamic telemetry data about the motor vehicle with one or more sensors disposed on the motor vehicle, and altering static and dynamic behavior of the motor vehicle with one or more actuators disposed on the motor vehicle. The method further includes utilizing a control module having a processor, a memory, and input/output (I/O) ports in communication with the one or more sensors and the one or more actuators, the control module executing program code portions stored in the memory. The program code portions include an offline program code portion and an online program code portion. The method further includes collecting, by the offline code portion, telemetry data from the motor vehicle, performing, by the offline code portion, failure analysis on the telemetry data; and allocating, by the offline code portion, tasks based on the failure analysis. The method further includes analyzing, by the online code portion, the telemetry data for failures within specific sensors, actuators, or functions that utilize systems of sensors and/or actuators; and mitigating, by the online code portion, deviations in the telemetry data by sending a correction to the one or more sensors, actuators, and/or functions of a motor vehicle motion control system.

In another aspect of the present disclosure the method includes collecting, by the offline code portion via the I/O ports, the real-time static and dynamic data from the one or more sensors, from the one or more actuators, and from one or more functions of a motor vehicle motion control system.

In another aspect of the present disclosure, the method further includes performing, by the offline code portion, failure mode determination for the one or more sensors, the one or more actuators, and the one or more functions, wherein the failure mode determination includes determining whether one or more sensors, one or more actuators and/or one or more functions is experiencing a degradation of performance, a complete failure, and/or a failure mode in which the telemetry data includes noise beyond a predefined threshold noise value.

In another aspect of the present disclosure, the method further includes performing, by the offline code portion, data preparation, generation, and collection for the one or more sensors, the one or more actuators, and the one or more functions, wherein the data preparation further comprises: exclusion, filtering, and/or buffering processes.

In another aspect of the present disclosure, the method further includes utilizing, by the offline code portion, a machine-learning architecture design to generate a task allocation scheme for the telemetry data from the one or more sensors, the one or more actuators, and the one or more functions. The machine-learning architecture further includes: machine-learning and/or artificial intelligence based clustering methods to identify failure modes and classifications.

In another aspect of the present disclosure, the method further includes applying a temporary or short-term mitigation to the one or more sensors, the one or more actuators, and/or the one or more functions and sending raw telemetry data to a cloud computing system for further analysis.

In another aspect of the present disclosure, the method further includes performing, by the online code portion, data exclusion on the telemetry data from the one or more sensors, the one or more actuators, and the one or more functions.

In another aspect of the present disclosure, the method further includes detecting and predicting, by the online code portion, potential failures within the one or more sensors, the one or more actuators, and the one or more functions.

In another aspect of the present disclosure, the method further includes communicating, by the online code portion via the I/O ports, the telemetry data from the one or more sensors, the one or more actuators, and the one or more functions between the motor vehicle and a I/O ports of a remote control module within a cloud computing system physically separate from the motor vehicle.

In another aspect of the present disclosure, the method further includes mitigating, by the online code portion, deviations in the telemetry data from the one or more sensors, the one or more actuators, and the one or more functions by applying a modified estimator algorithm and/or altered calibration correction to the one or more sensors, the one or more actuators, and the one or more functions.

In another aspect of the present disclosure, a method for motor vehicle motion control system health monitoring further includes measuring real-time static and dynamic telemetry data about the motor vehicle with one or more sensors disposed on the motor vehicle, and altering static and dynamic behavior of the motor vehicle with one or more actuators disposed on the motor vehicle. The method further includes utilizing a control module having a processor, a memory, and input/output (I/O) ports in communication with the one or more sensors and the one or more actuators, the control module executing program code portions stored in the memory. The program code portions include an offline program code portion and an online program code portion. The method further includes collecting, by the offline code portion via the I/O ports, telemetry data from the motor vehicle including real-time static and dynamic data from the one or more sensors, from the one or more actuators, and from one or more functions of a motor vehicle motion control system. The method further includes performing, by the offline code portion, data preparation, generation, and collection for the one or more sensors, the one or more actuators, and the one or more functions, wherein the data preparation further comprises exclusion, filtering and/or buffering processes. The method further includes performing, by the offline code portion, failure mode determination for the one or more sensors, the one or more actuators, and the one or more functions. The failure mode determination includes determining whether one or more sensors, one or more actuators and/or one or more functions is experiencing a degradation of performance, a complete failure, and/or a failure mode in which the telemetry data includes noise beyond a predefined threshold noise value. The method further includes allocating, by a machine-learning architecture within the offline code portion, tasks based on the failure analysis. The machine-learning architecture further comprises: machine-learning and/or artificial intelligence based clustering methods identifying failure modes and classifications. The online code portion analyzes the telemetry data for failures within specific sensors, actuators, or functions that utilize systems of sensors and/or actuators. The online code portion performs data exclusion on the telemetry data from the one or more sensors, the one or more actuators, and the one or more functions. The online code portion detects and predicts potential failures within the one or more sensors, the one or more actuators, and the one or more functions. The online code portion communicates, via the I/O ports, the telemetry data from the one or more sensors, the one or more actuators, and the one or more functions between the motor vehicle and a I/O ports of a remote control module within a cloud computing system physically separate from the motor vehicle. The online code portion mitigates deviations in the telemetry data from the one or more sensors, the one or more actuators, and the one or more functions by sending a correction including applying a modified estimator algorithm and/or altered calibration correction to the one or more sensors, the one or more actuators, and the one or more functions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
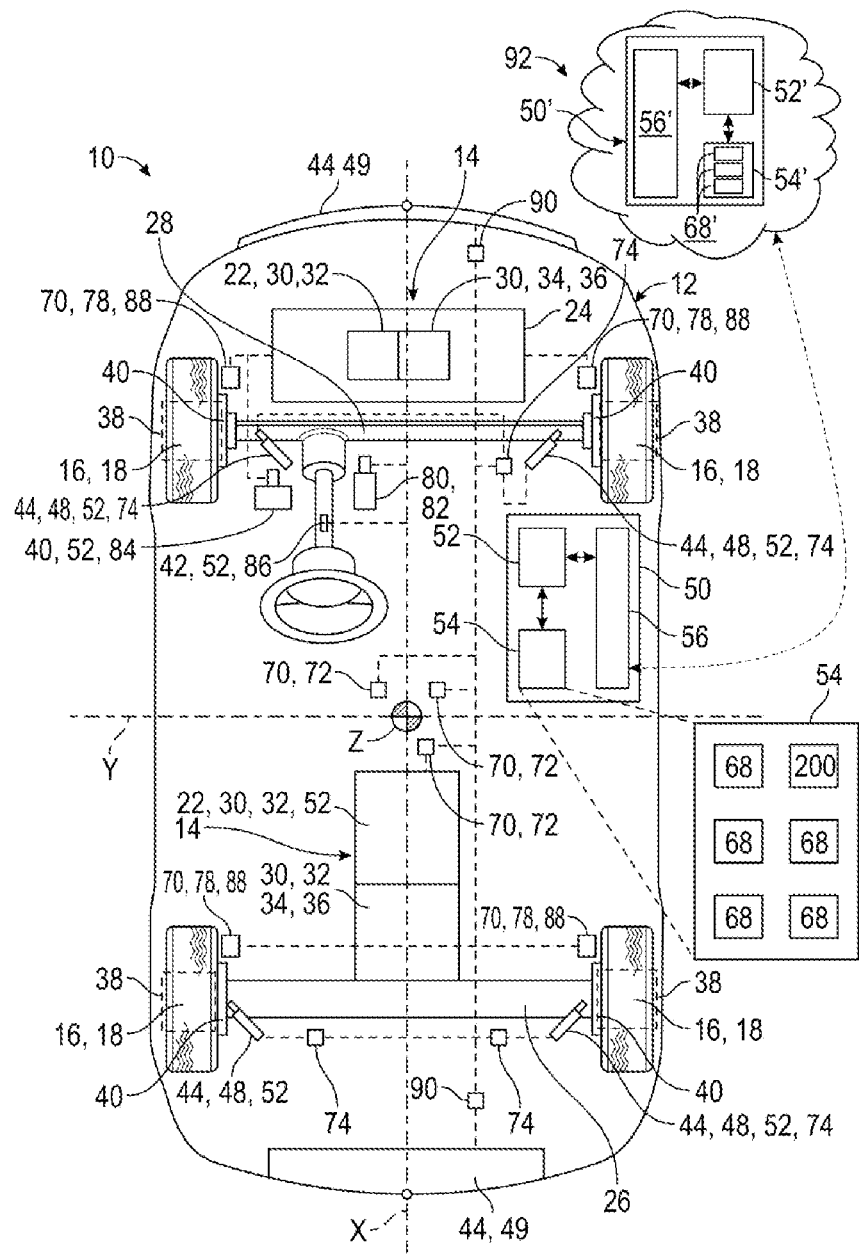
FIG. 1 is a schematic view of a system and method for vehicle motion control health monitoring and mitigation according to an aspect of the present disclosure.

Referring to FIG. 1, a motor vehicle motion control (VMC) health monitoring system 10 is shown. The system 10 operates on one or more motor vehicles 12. The motor vehicle 12 is shown as a car, but it should be appreciated that the motor vehicle 12 may be a van, bus, tractor-trailer, semi, SUV, truck, bicycle, e-bike, tricycle, motorcycle, airplane, helicopter, amphibious vehicle, or any other such vehicle without departing from the scope or intent or the present disclosure. In the example shown in FIG. 1, the motor vehicle 12 is equipped with a powertrain 14 which is capable of transmitting motive force to wheels 16 of the motor vehicle, and to tires 18 affixed to the wheels 16. The powertrain 14 may include a variety of components, such as internal combustion engines (ICE) 20, and/or electric motors 22, as well as transmissions 24 capable of transmitting torque from the ICEs 20, and/or electric motors 22 to the wheels 16. In one example, the motor vehicle 12 may include an ICE 20 acting on a rear axle 26 of the motor vehicle 12 as well as one or more electric motors 22 acting on a front axle 28 of the motor vehicle 12. In additional examples, the motor vehicle 12 may use one or more ICEs 20, and/or one or more electric motors 22 arranged in additional configurations and providing torque to either front or rear axles 28, 26, or even to individual wheels 16 of the motor vehicle 12 without departing from the scope or intent of the present disclosure.

In several aspects, the powertrain 14 includes one or more in-plane actuators 30. The in-plane actuators 30 may include all-wheel drive (AWD) systems including electronically-controlled or electric AWD (eAWD) 32 systems, as well as limited slip differentials (LSDs) 34 including electronically-controlled or electric LSD (eLSD) 36 systems. In-plane actuators 30 can generate or modify force generation in X and/or Y directions at a tire 18 to road surface contact patch 38 within a predetermined capacity. An eAWD 32 system may transfer torque from a front to a rear of the motor vehicle 12 and/or from side-to-side of the motor vehicle 12. Likewise, an eLSD 36 may transfer torque from side-to-side of the motor vehicle 12. In some examples, the eAWD 32 and/or eLSD 36 may directly alter or manage torque delivery from the ICE 20 and/or electric motors 22 and/or the eAWD 32 and eLSD 36 may act on a braking system 40 to adjust a quantity of torque delivered to each of the tires 18 of the motor vehicle 12. Additional in-plane actuators 30 may include active steering or electronic power steering (EPS) systems 42 at either or both of the front and rear axles 28, 26. Active steering systems or EPS systems 42 may actively adjust an angle of the wheels 16 relative to the longitudinal axis of the motor vehicle 12.

In further examples, the motor vehicle 12 may include a means of altering a normal force on each of the tires 18 of the motor vehicle 12 via one or more out-of-plane actuators 44. The out-of-plane actuators 44 of the motor vehicle 12 may include any of a wide variety of actuators 44 capable of managing vertical movement of the motor vehicle 12. In several aspects, the out-of-plane actuators 44 may include active aerodynamic actuators 46, active suspension actuators 48, or the like. Active aerodynamic actuators 46 may actively or passively alter an aerodynamic profile of the motor vehicle via one or more active aerodynamic elements 49 such as wings, spoilers, fans or other suction devices, actively-managed Venturi tunnels, splitters, or the like. Active suspension actuators 48 adjust suspension travel, spring rates, and damping characteristics. In some examples, the active suspension actuators 48 may include magneto-rheological dampers, pneumatic dampers or springs, or other such electrically, hydraulically, or pneumatically adjusted dampers or springs without departing from the scope or intent of the present disclosure.

The terms "forward", "rear", "inner", "inwardly", "outer", "outwardly", "above", and "below" are terms used relative to the orientation of the motor vehicle 12 as shown in the drawings of the present application. Thus, "forward" refers to a direction toward a front of a motor vehicle 12, "rearward" refers to a direction toward a rear of a motor vehicle 12. "Left" refers to a direction towards a left-hand side of the motor vehicle 12 relative to the front of the motor vehicle 12. Similarly, "right" refers to a direction towards a right-hand side of the motor vehicle 12 relative to the front of the motor vehicle 12. "Inner" and "inwardly" refers to a direction towards the interior of a motor vehicle 12, and "outer" and "outwardly" refers to a direction towards the exterior of a motor vehicle 12, "below" refers to a direction towards the bottom of the motor vehicle 12, and "above" refers to a direction towards a top of the motor vehicle 12. Further, the terms "top", "overtop", "bottom", "side" and "above" are terms used relative to the orientation of the actuators, and the motor vehicle 12 more broadly shown in the drawings of the present application. Thus, while the orientation of actuators 52, or motor vehicle 12 may change with respect to a given use, these terms are intended to still apply relative to the orientation of the components of the system 10 and motor vehicle 12 components shown in the drawings.

The system 10 further includes one or more controllers 50. The controllers 50 are non-generalized electronic control devices having a preprogrammed digital computer or processor 52, non-transitory computer readable medium or memory 54 used to store data such as control logic, software applications, instructions, computer code, data, lookup tables, etc., and input/output (I/O) ports 56. Computer readable medium or memory 54 includes any type of medium capable of being accessed by a computer, such as read only memory (ROM), random access memory (RAM), a hard disk drive, solid-state memory, a compact disc (CD), digital video disc (DVD), or any other type of memory 54. A non-transitory computer readable memory 54 excludes wired, wireless, optical, or other communication links that transport transitory electrical or other signals. A non-transitory computer readable memory 54 includes media where data can be permanently stored and media where data can be stored and later overwritten, such as a rewritable optical disc or an erasable memory device. Computer code includes any type of program code, including source code, object code, and executable code. The processor 52 is configured to execute the code or instructions. The motor vehicle 12 may have controllers 50 including a dedicated Wi-Fi controller, an engine control module, a transmission control module, a body control module, a suspension control module, a brake control module, an infotainment control module, or the like. The I/O ports 56 may be configured to communicate via wired communications, wirelessly via Wi-Fi protocols under IEEE 802.11x, cellular links, satellite links, or the like without departing from the scope or intent or the present disclosure.

The on-board controller 50 further includes one or more applications 68. An application 68 is a software program configured to perform a specific function or set of functions. The application 68 may include one or more computer programs, software components, sets of instructions, procedures, functions, objects, classes, instances, related data, or a portion thereof adapted for implementation in a suitable computer readable program code. The applications 68 may be stored within the memory 54 or in additional or separate memory 54. In several aspects, applications 68 may manage powertrain system functions, suspension system functions, brake system functions, aerodynamic system functions, and/or body control system functions in an exemplary motor vehicle 12.

Applications 68 managing powertrain system functions, suspension system functions, brake system functions, aerodynamic system functions, and body control system functions in the motor vehicle 12 receive static and/or dynamic vehicle state information or sensory data from a suite of sensors 70 disposed on the motor vehicle 12. The sensors 70 may include any of a wide variety of sensors including inertial measurement units (IMUs) 72, suspension control units such as Semi Active Damping Suspension (SADS) 74, global positioning system (GPS) 76 sensors, wheel speed sensors 78, throttle position sensors 80, accelerator pedal position sensors 82, brake pedal position sensors 84, steering position sensors 86, tire pressure monitoring sensors 88, aerodynamic element position sensors 90, and the like. IMUs 72 measure movement, acceleration, and the like in several degrees of freedom. In a specific example, the IMUs 72 may measure position, movement, acceleration and the like in three or more degrees of freedom. Likewise the SADS 74 sensors may be IMUs 72 capable of measuring in three or more degrees of freedom. In some more specific examples, the SADS 74 may be suspension hub accelerometers, or the like. The sensory data may therefore include, but not be limited to: wheel 16 speed data, SADS 74 and IMU 72 data including attitude, acceleration, and the like.

The sensory data is transmitted to the controllers 50 via the I/O ports 56, where the applications 68 utilize the sensory data about the motor vehicle 12 to determine what the positions of the in-plane actuators 30 and out-of-plane actuators 44 should be to achieve a certain motor vehicle 12 state.

The system 10 further includes an off-vehicle or remote computing system 92. The remote computing system 92 may include one or more off-board or remote controllers 50' substantially similar in architectural design to those described hereinabove. That is, the remote controllers 50' include digital processors 52', computer readable memory 54' and I/O ports 56'. The memory 54' of the remote computing system 92 stores one or more applications 68' which are executable by the digital processors 52' and the I/O ports 56' of the remote computing system 92 communicate with the I/O ports 56 of the controllers 50 of the motor vehicle 12.

Figure 2A:
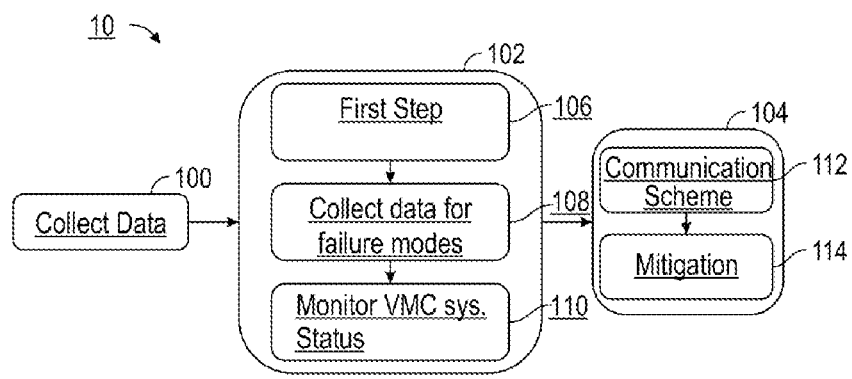
FIG. 2A is a flow chart depicting an overview of the system and method for vehicle motion control health monitoring and mitigation of FIG. 1 according to an aspect of the present disclosure.
Figure 2B:
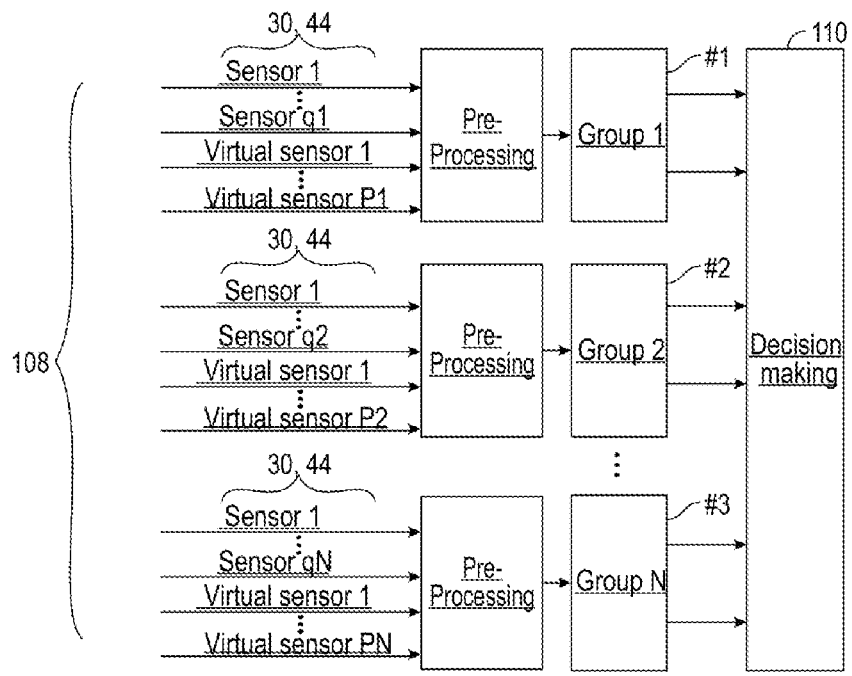
FIG. 2B is a flow chart depicting a set of logical steps for grouping telemetry data in the system and method for vehicle motion control health monitoring and mitigation of FIG. 2A according to an aspect of the present disclosure.

Turning now to FIGS. 2A and 2B, and with continuing reference to FIG. 1, the system 10 for motor VMC health monitoring collects data about the motor vehicle 12 at block 100. More specifically, at block 100, the system 10 utilizes the sensory data within one or more on-board applications 68 and one or more off-board or remote applications 68' to detect or predict potential failures in the various sensors 70 and/or in-plane and out-of-plane actuators 30, 44. To address large-scale VMC, a structured machine-learning (ML)-based architecture is utilized within the on-board and remote applications 68, 68'. The ML architecture consists broadly of an offline stage 102 or offline program code portion and an online stage 104 or online code portion. The offline stage 102 performs a first step 106 of data preparation, collection, and labeling of the sensory data from the various sensors 70 and in-plane and out-of-plane actuators 30, 44. In the first step 106 of the offline stage 102, the system 10 sets failure modes for each function of the motor vehicle. For example, an IMU 72 or a wheel speed sensor 78 or an actuator such as an electric motor 22, an EPS 42, a transmission 24, an ICE 20, or the like has individualized failure modes and system failure modes based on predefined parameters or domain knowledge. In several aspects, the first step 106 of the offline stage 102 also utilizes machine learning (ML) and/or artificial intelligence (AI) based clustering methods to identify failure modes and classifications even in situations where a single physical system may not be in a failed state, but in combination with the status of other physical systems or software functions, the broader VMC system may be in a state of failure. In an example of a software failure, the failure mode may be a degradation of performance which may be further sub-categorized into multiple levels of degradation, or the failure mode may be a complete failure, or the failure mode may simply be noise in data beyond a predefined threshold value. The failure mode may then be categorized based on causation. For example, the software failure may be attributable to input errors, an algorithmic issue such as unmodeled dynamics, a calibration issue, or the like. The system 10 then analyzes data including system input signals, system 10 output signals, and checkpoint signals from internal system 10 check steps.

The system 10 subsequently performs a second step 108 of the offline stage 102 in which the system collects a set of data for an idealized scenario where no failure has happened. Depending on the failure mode for each specific function, the system 10 applies an artificial failure to each input and/or model. The system 10 then collects inputs and outputs of each function or feature and utilizes these inputs and outputs in a third step 110 of the offline stage 102.

In the third step 110 of the offline stage 102, a structured multi-group ML/AI architecture is utilized to monitor the status of the VMC system functions, features, and hardware. The third step 110 further classifies and groups the functions, features, and hardware based on the criticality of the functions, features, and hardware to the operation of the motor vehicle 12 and more specifically to VMC. In several aspects, the features may include torque vectoring between the front and rear axles 28, 26 and/or between individual wheels 16 via the AWD or eAWD 32, LSDs 34 and/or eLSDs 36 or the like.

Inputs to each group consist of direct measurements from various sensors 70 and in-plane and out-of-plane actuators 30, 44 or estimations of measurements. The estimations of measurements may be thought of as virtual sensors. That is, by interpreting the data from one or more sensors 70 and in-plane and out-of-plane actuators 30, 44, additional VMC information may be indirectly gleaned. The indirectly-gleaned information may relate to specific physical or functional conditions of the motor vehicle 12 and the VMC system. Additionally, a confidence level for the accuracy of each group is determined. The confidence level provides a measure of the accuracy of each of the groups, and is used to provide weight in weighted calculations involving each of the groups.

Priority and criticality determine which functions, features, and hardware are placed in each. More specifically, prioritization of functions, features, and hardware allows the system 10 to determine whether computational processes regarding possible failures or the like should be carried out locally within one or more motor vehicle 12 controllers 50 or within one or more remote controllers 50' such as controllers 50' disposed within a cloud computing system.

In a prioritization example, the system 10 receives sensory data from one or more of the wheel speed sensors 78, steering position sensor 86, IMU 72, one or more functions such as vehicle speed functions, wheel 16 control functions, or the like. As each of the foregoing sensors, features, and functions are directly implicated in motor vehicle 12 control and safety, these sensors, features, and functions may be designated as belonging within a priority #1 group. Likewise, sensors such as EPS 42 torque sensors, functions such as tire 18 force estimation, and features such as AWD 32, LSD 34, eLSD 36, or the like may be designated as belonging within a priority #2 group. Data from additional sensors, features, and functions may be similarly grouped into lower priority groups depending on various factors as indicated by Priority #N groupings such as those including rain sensors (not shown), spring rate degradation functions, and features such as agility enhancement.

Figure 2C:
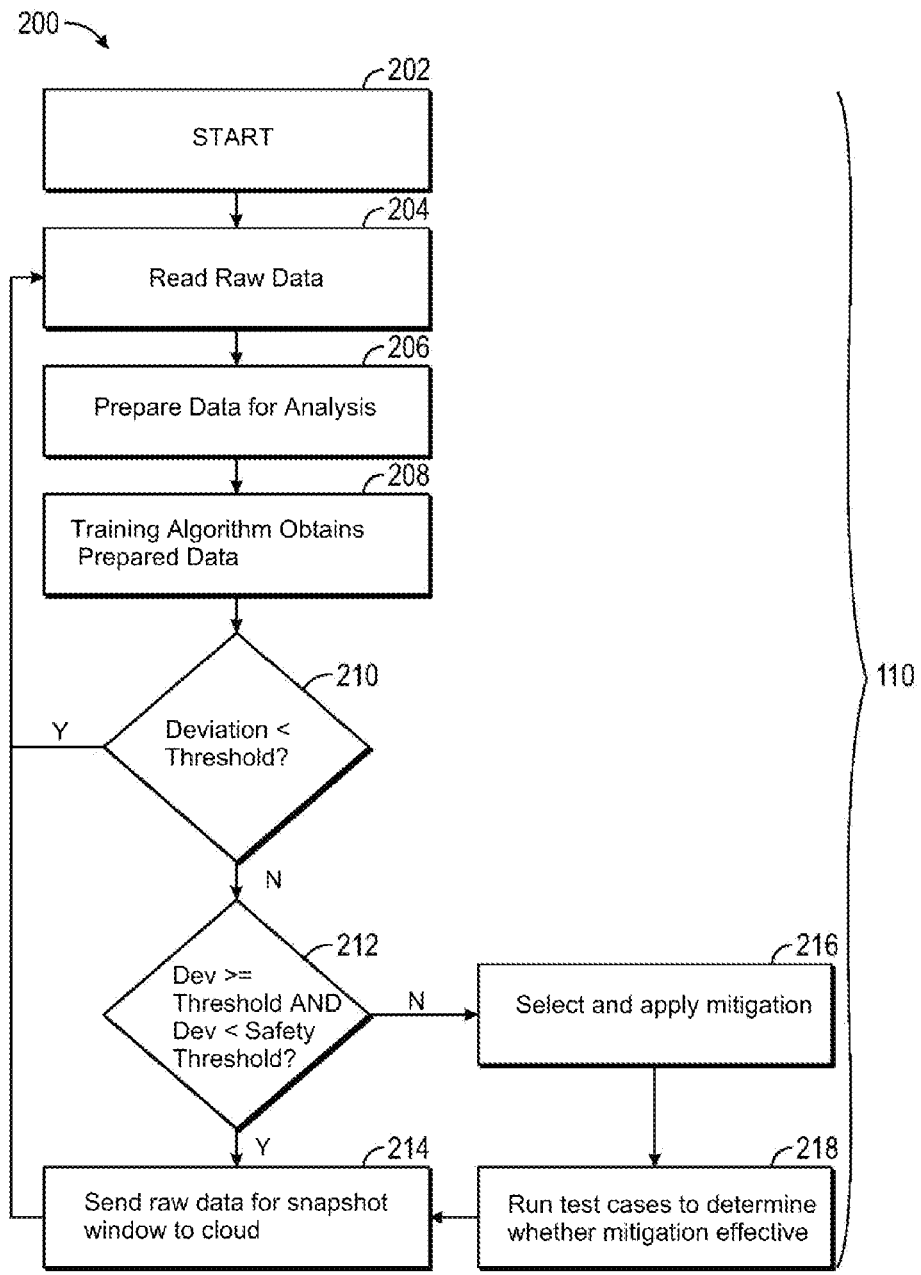
FIG. 2C is a flow chart depicting a training algorithm for the system and method for vehicle motion control health monitoring and mitigation of FIG. 2A according to an aspect of the present disclosure.

Turning now to FIG. 2C in particular and with continuing reference to FIGS. 1-2B a flowchart depicting a training algorithm 200 for splitting the computational burden between on-board controllers 50 and remote or cloud-based controllers 50' is shown. The training algorithm 200 is an application 68, 68' according to the description above. More specifically, at block 202, the training algorithm 200 is initialized or started. At block 204, the training algorithm 200 reads raw data from the sensors 70 on the motor vehicle 12 over a snapshot covering a predefined quantity of time. The predefined quantity of time may vary but should generally be understood to encompass a quantity of time sufficient for the sensors 70 and in-plane and out-of-plane actuators 30, 44 to generate data. That is, the response time for each of the sensors 70 and in-plane and out-of-plane actuators 30, 44 is used in the determination of the length of time defining the snapshot. The snapshots are temporarily held in memory 54 within the on-board controller 50, for example within a cyclic buffer in RAM before being transmitted or processed. At block 206, the training algorithm 200 prepares data for further analysis. The data preparation may include various different processes such as exclusion, and/or filtering, and/or buffering processes or the like. At block 208, the prepared or processed data is obtained from the data preparation by the training algorithm 200. At block 210, the training algorithm 200 determines whether the data for one or more of the sensors 70, in-plane and out-of-plane actuators 30, 44, one or more features and one or more functions has a deviation that is below a predefined or ML-set or adjusted deviation threshold value. If at block 210, the data is below the deviation threshold value, then the training algorithm 200 returns to block 204 where the raw sensor data is read once more over a new snapshot in time.

However, if the data is above the deviation threshold value, then the training algorithm 200 proceeds to block 212 where the training algorithm 200 determines whether the deviation in the data is equal to or above the deviation threshold value and additionally whether the deviation is below a predefined safety threshold. The safety threshold may encompass any of a variety of different parameters from emissions controls, air quality within the motor vehicle 12, lateral and/or longitudinal and/or vertical accelerations and velocities, steering angles, braking characteristics, torque vectoring settings, or the like without departing from the scope or intent of the present disclosure. If the deviation in the data is equal to or greater than the deviation threshold value and below the safety threshold value, then the raw sensor data for the snapshot is sent for processing to the remote or cloud-based controllers 50' for further processing at block 214. By contrast, if the deviation in the data is above the safety threshold and/or below the deviation threshold value, the training algorithm 200 proceeds to block 216. At block 216 the training algorithm selects and applies a mitigation approach that attempts to address the deviation and bring the raw sensor data back within a range of expected values. At block 218, the training algorithm 200 runs a variety of test cases to determine whether the mitigation approach chosen has been effective, and then proceeds to block 214 where the raw sensor data as well as the test case information and mitigation approach information is forwarded to the cloud-based controllers 50'. From block 214, the training algorithm proceeds back to block 204 where the training algorithm 200 proceeds to read data from the sensors 70 and in-plane and out-of-plane actuators 30, 44 on the motor vehicle 12 continuously. It should be appreciated that the training algorithm 200 of FIG. 2C may be run in an online or offline mode and/or in real-time without departing from the scope or intent of the present disclosure.

The decision whether to proceed from block 212 to block 214 or to block 216 is based on both the deviation threshold value and the safety threshold value. It should be appreciated as a general matter that the amount of data being produced by the VMC system is large, and that the on-board controllers 50 have limited memory and limited processing capacity, while the controllers 50' in the cloud have substantially larger memory and processing capacities. However, the movement of data from the motor vehicle 12 to the cloud is limited by the means and bandwidth of the communications between the motor vehicle 12 and controllers 50' within the cloud. Accordingly, some processing tasks are assigned to cloud-based controllers 50' in the online stage 104 of data processing, while others are assigned to and carried out by on-board controllers 50 in the offline stage 102.

In some specific examples, the communication scheme 112 in the online stage 104 carries out the determination to process the deviation in the data via on-board controllers 50 or cloud-based controllers 50' based in part on the type of deviation, i.e. whether safety considerations are implicated, as well as in part on the amount of computational resources necessary to address the deviation in the data. That is, computer processing capabilities within the motor vehicle 12 are limited by the hardware of the on-board controllers 50, while significantly greater processing resources are available in the cloud-based controllers 50'. However, the transmission of the deviation data to the cloud-based controllers 50' is limited by the bandwidth of the data connection between on-board and cloud-based controllers 50, 50'. Accordingly, in some circumstances it may take too much time to transmit the deviation data to the cloud-based controller 50' for this solution to be practical and/or provide for the rapid VMC responses necessary to maintain safe motor vehicle 12 operation. In situations where the deviation is safety critical, the system 10 applies a temporary or short-term mitigation strategy to the data and proceeds to send the raw data to the cloud for further analysis. The temporary or short-term mitigation strategy is a predefined output to the sensors 70, in-plane and out-of-plane actuators 30, 44, functions, features, or the like that substantially addresses the data deviation. The predefined output is obtained from a lookup table or other such data repository having predefined values. By contrast, when non-safety-critical deviations are found, the system 10 simply sends the raw data to the cloud-based controller 50' for further analysis without necessarily applying a short-term mitigation strategy. That is, the computational resources necessary to accurately and precisely correct for deviations in the data may be located in the cloud for non safety-critical data deviations.

In some further examples, deviations in the data may be addressed in a hybrid manner. That is, some processing such as regressions, curve-fitting processes, or parity algorithms may be carried out by the on-board controllers 50 while additional processes may be carried out on the regressed or curve-fit data in the cloud-based controllers 50'. Additionally, the data from each snapshot may be augmented by live data such as motor vehicle 12 telemetry from the on-board sensors 70 as the snapshot data and/or deviation data is uploaded to the cloud-based controllers 50' for off-board assessments to be carried out.

In a specific example, a motor vehicle 12 user may maneuver the motor vehicle 12 by manipulating one or more of the accelerator pedal, steering wheel, brake pedal, or the like. The inputs to the accelerator pedal, steering wheel, or brake pedal are read by the accelerator pedal position sensor 82, steering position sensor 86, and brake pedal position sensor 84, and sent to the on-board controller 50. A determination is made within the on-board controller 50 as to whether or not the signal is within known threshold values. Additional information from other sensors 70 on the motor vehicle 12 are also reported to the on-board controller 50 as well as, for example, a GPS position. These data define event information that is processed on-board by a ML algorithm or model-based algorithm resident within memory 54 of the on-board controller 50. Data inputs to the ML algorithm and/or model-based algorithm may also include trip statistics, such as minimum and maximum values, averages, and standard deviations reported by each sensor 70. The on board controller 50 then decides to send out signals and/or data according to default settings. In some situations, the on board controller 50 may communicate with the remote controller 50' to increase signal rate or data rate for communications to address particularly critical situations. That is, the on board controller 50 may negotiate with additional controllers 50 within the motor vehicle 12 and/or remote controllers 50' in the cloud to satisfy communication speed and bandwidth requirements, to increase signal or data rate and to take on-board mitigation actions at block 114.

For each function or a given set of functions, multiple solutions are designed so that each solution can reliably accomplish a given task. This redundancy provides robustness and reduces the potential for mitigation failures to occur. Each of the multiple solutions is based on a different set of signals so that different ways of estimating signals result. Some specific failure modes are associated with each function, and when the system 10 ascertains that a particular failure mode is present, the system 10 provides mitigation outputs at block 114 to relevant in-plane and/or out-of-plane actuators 30, 44 which are blended based on the confidence level for each function. More specifically, all degradations, deviations, or failures are communicated with the remote, remote controller 50' and the remote controller 50' sends the mitigation outputs to the controllers 50 within the motor vehicle 12 where the mitigation outputs are applied to relevant VMC systems. Mitigation outputs may take a variety of forms including but not limited to modified estimator algorithm parameters, altered calibrations, or the like for each sensor 70, in-plane and/or out-of-plane actuator 30,44, function, and/or feature implicated.

A motor vehicle motion control health monitoring system of the present disclosure offers several advantages. These include the ability to actively, continuously, accurately, and precisely manage vehicle performance in longitudinal and lateral acceleration, pitch, roll, and yaw in a wide variety of ambient and road surface conditions. In addition, the VMC health monitoring system 10 of the present disclosure allows a cost-effective, resource-optimized means of managing the health of complex VMC systems with a large numbers of interacting functions by actively, continuously. More specifically, the VMC health monitoring system 10 of the present disclosure offers means of safely mitigating performance degradation or deterioration of system component performance or even failure of the VMC system while maintaining or reducing cost and complexity, and improving motor vehicle 12 motion control.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A motor vehicle motion control health monitoring system, comprising:
   one or more sensors disposed on the motor vehicle, the one or more sensors directly and indirectly measuring real-time static and dynamic telemetry data about the motor vehicle;
   one or more actuators disposed on the motor vehicle, the one or more actuators altering static and dynamic behavior of the motor vehicle, wherein indirect measurements define virtual sensors that are interpretations of telemetry data from the one or more sensors and the one or more actuators;
   a control module having a processor, a memory, and input/output (I/O) ports in communication with the one or more sensors and the one or more actuators, the control module executing program code portions stored in the memory, the program code portions comprising;
      an offline program code portion that collects telemetry data from the motor vehicle, performs failure analysis on the telemetry data and allocates tasks based on the failure analysis; and
      an online program code portion that analyzes the telemetry data for failures within specific sensors, actuators, or functions that utilize systems of sensors and/or actuators and mitigates deviations in the telemetry data from the one or more sensors, the one or more actuators, and the one or more functions by sending a correction to the one or more sensors, actuators, and/or functions of a motor vehicle motion control system, wherein the correction comprises: applying a modified estimator algorithm and/or altered calibration correction to the one or more sensors, the one or more actuators, and the one or more functions; and
      wherein the online program code portion determines a priority and a criticality for the one or more functions, the one or more sensors, and the one or more actuators such that the one or more functions, the one or more sensors, and the one or more actuators that are involved directly in vehicle control are designated as belonging in a high priority group and the one or more functions, sensors, and actuators indirectly involved in vehicle control are designated as belonging in a priority group having a lower priority than the high priority group, wherein telemetry data relating to high priority groups is processed onboard the vehicle and telemetry data relating to groups having lower priorities is selectively processed in a remote cloud computing system; and wherein the modified estimator algorithm and/or altered calibration correction utilize one or more of multiple mitigation solutions, each of the mitigation solutions based on different telemetry data, to generate a mitigation output that causes the one or more sensors, actuators and/or functions of the motor vehicle control system to actively, continuously, and manage vehicle performance in longitudinal and lateral acceleration, pitch, roll, and yaw regardless of ambient conditions and road surface conditions.

2. The system of claim 1 wherein the offline program code portion further comprises:

a first program code portion that collects, via the I/O ports, the real-time static and dynamic data from the one or more sensors, from the one or more actuators, and from one or more functions of a motor vehicle motion control system.

3. The system of claim 1 wherein the offline program code portion further comprises:

a second program code portion that performs failure mode determination for the one or more sensors, the one or more actuators, and the one or more functions, wherein the failure mode determination includes determining whether one or more sensors, one or more actuators and/or one or more functions is experiencing a degradation of performance, a complete failure, and/or a failure mode in which the telemetry data includes noise beyond a predefined threshold noise value.

4. The system of claim 1 wherein the offline program code portion further comprises:

a third program code portion that performs data preparation, generation, and collection for the one or more sensors, the one or more actuators, and the one or more functions, wherein the data preparation further comprises: exclusion, filtering, and/or buffering processes.

5. The system of claim 1 wherein the offline program code portion further comprises:

a fourth program code portion that utilizes a machine-learning architecture design to generate a task allocation scheme for the telemetry data from the one or more sensors, the one or more actuators, and the one or more functions, wherein the machine-learning architecture further comprises: machine-learning and/or artificial intelligence based clustering methods to identify failure modes and classifications, and wherein the fourth program code portion further applies a temporary or short-term mitigation to the one or more sensors, the one or more actuators, and/or the one or more functions and sending raw telemetry data to the cloud computing system for further analysis.

6. The system of claim 1 wherein the online program code portion further comprises:

a fifth program code portion that performs data exclusion on the telemetry data from the one or more sensors, the one or more actuators, and the one or more functions.

7. The system of claim 1 wherein the online program code portion further comprises:

a sixth program code portion that detects and predicts potential failures within the one or more sensors, the one or more actuators, and the one or more functions.

8. The system of claim 1 wherein the online program code portion further comprises:

a seventh program code portion that communicates, via the I/O ports, the telemetry data from the one or more sensors, the one or more actuators, and the one or more functions between the motor vehicle and I/O ports of a remote control module within the cloud computing system physically separate from the motor vehicle.

9. A method for motor vehicle motion control system health monitoring, the method comprising:

measuring real-time static and dynamic telemetry data about the motor vehicle with one or more sensors disposed on the motor vehicle;

altering static and dynamic behavior of the motor vehicle with one or more actuators disposed on the motor vehicle;

utilizing a control module having a processor, a memory, and input/output (I/O) ports in communication with the one or more sensors and the one or more actuators, the control module executing program code portions stored in the memory, wherein the program code portions include an offline program code portion and an online program code portion;

collecting, by the offline code portion, telemetry data from the motor vehicle;

performing, by the offline code portion, failure analysis on the telemetry data; and allocating, by the offline code portion, tasks based on the failure analysis;

analyzing, by the online code portion, the telemetry data for failures within specific sensors, actuators, or functions that utilize systems of sensors and/or actuators; and mitigating, by the online code portion, deviations in the telemetry data from the one or more sensors, the one or more actuators, and the one or more functions by sending a correction to the one or more sensors, actuators, and/or functions of a motor vehicle motion control system, wherein the correction comprises: applying a modified estimator algorithm and/or altered calibration correction to the one or more sensors, the one or more actuators, and the one or more functions; and wherein the online program code portion determines a priority and a criticality for the one or more functions, the one or more sensors, and the one or more actuators such that the one or more functions, the one or more sensors, and the one or more actuators that are involved directly in vehicle control are designated as belonging in a high priority group and the one or more functions, sensors, and actuators indirectly involved in vehicle control are designated as belonging in a priority group having a lower priority than the high priority group, wherein telemetry data relating to high priority groups is processed onboard the vehicle and telemetry data relating to groups having lower priorities is selectively processed in a remote cloud computing system; and wherein the modified estimator algorithm and/or altered calibration correction utilize one or more of multiple mitigation solutions, each of the mitigation solutions based on different telemetry data, to generate a mitigation output that causes the one or more sensors, actuators and/or functions of the motor vehicle control system to actively, continuously, and manage vehicle performance in longitudinal and lateral acceleration, pitch, roll, and yaw regardless of ambient conditions and road surface conditions.

10. The method of claim 9 further comprising:
collecting, by the offline code portion via the I/O ports, the real-time static and dynamic data from the one or more sensors, from the one or more actuators, and from one or more functions of a motor vehicle motion control system.

11. The method of claim 9 further comprising:
performing, by the offline code portion, failure mode determination for the one or more sensors, the one or more actuators, and the one or more functions, wherein the failure mode determination includes determining whether one or more sensors, one or more actuators and/or one or more functions is experiencing a degradation of performance, a complete failure, and/or a failure mode in which the telemetry data includes noise beyond a predefined threshold noise value.

12. The method of claim 9 further comprising:
performing, by the offline code portion, data preparation, generation, and collection for the one or more sensors, the one or more actuators, and the one or more functions, wherein the data preparation further comprises: exclusion, filtering, and/or buffering processes.

13. The method of claim 9 further comprising:
utilizing, by the offline code portion, a machine-learning architecture design to generate a task allocation scheme for the telemetry data from the one or more sensors, the one or more actuators, and the one or more functions, wherein the machine-learning architecture further comprises: machine-learning and/or artificial intelligence based clustering methods to identify failure modes and classifications.

14. The method of claim 9 further comprising:
applying a temporary or short-term mitigation to the one or more sensors, the one or more actuators, and/or the one or more functions and sending raw telemetry data to the cloud computing system for further analysis.

15. The method of claim 9 further comprising:
performing, by the online code portion, data exclusion on the telemetry data from the one or more sensors, the one or more actuators, and the one or more functions.

16. The method of claim 9 further comprising:
detecting and predicting, by the online code portion, potential failures within the one or more sensors, the one or more actuators, and the one or more functions.

17. The method of claim 9 further comprising:
communicating, by the online code portion via the I/O ports, the telemetry data from the one or more sensors, the one or more actuators, and the one or more functions between the motor vehicle and a I/O ports of a remote control module within the cloud computing system physically separate from the motor vehicle.

18. A method for motor vehicle motion control system health monitoring, the method comprising:
measuring, directly and indirectly, real-time static and dynamic telemetry data about the motor vehicle with one or more sensors disposed on the motor vehicle;
altering static and dynamic behavior of the motor vehicle with one or more actuators disposed on the motor vehicle, wherein indirect measurements define virtual sensors that are interpretations of telemetry data from the one or more sensors and one or more actuators;
utilizing a control module having a processor, a memory, and input/output (I/O) ports in communication with the one or more sensors and the one or more actuators, the control module executing program code portions stored in the memory, wherein the program code portions include an offline program code portion and an online program code portion;
collecting, by the offline code portion via the I/O ports, telemetry data from the motor vehicle including real-time static and dynamic data from the one or more sensors, from the one or more actuators, and from one or more functions of a motor vehicle motion control system;
performing, by the offline code portion, data preparation, generation, and collection for the one or more sensors, the one or more actuators, and the one or more functions, wherein the data preparation further comprises exclusion, filtering and/or buffering processes;
performing, by the offline code portion, failure mode determination for the one or more sensors, the one or more actuators, and the one or more functions, wherein the failure mode determination includes determining whether one or more sensors, one or more actuators and/or one or more functions is experiencing a degradation of performance, a complete failure, and/or a failure mode in which the telemetry data includes noise beyond a predefined threshold noise value;
allocating, by a machine-learning architecture within the offline code portion, tasks based on the failure mode determination, wherein the machine-learning architecture further comprises: machine-learning and/or artificial intelligence based clustering methods identifying failure modes and classifications;
analyzing, by the online code portion, the telemetry data for failures within specific sensors, actuators, or functions that utilize systems of sensors and/or actuators; and
performing, by the online code portion, data exclusion on the telemetry data from the one or more sensors, the one or more actuators, and the one or more functions;
detecting and predicting, by the online code portion, potential failures within the one or more sensors, the one or more actuators, and the one or more functions;
communicating, by the online code portion via the I/O ports, the telemetry data from the one or more sensors, the one or more actuators, and the one or more functions between the motor vehicle and a I/O ports of a remote control module within a cloud computing system physically separate from the motor vehicle; and
mitigating, by the online code portion, deviations in the telemetry data from the one or more sensors, the one or more actuators, and the one or more functions by sending a correction including applying a modified estimator algorithm and/or altered calibration correction to the one or more sensors, the one or more actuators, and the one or more functions; and
wherein the online program code portion determines a priority and a criticality for the one or more functions, the one or more sensors, and the one or more actuators such that the one or more functions, the one or more sensors, and the one or more actuators that are involved directly in vehicle control are designated as belonging in a high priority group and the one or more functions, sensors, and actuators indirectly involved in vehicle control are designated as belonging in a priority group having a lower priority than the high priority group, wherein telemetry data relating to high priority groups is processed onboard the vehicle and telemetry data relating to groups having lower priorities is selectively processed in a remote cloud computing system; and wherein the modified estimator algorithm and/or altered calibration correction utilize one or more of multiple mitigation solutions, each of the mitigation solutions based on different telemetry data, to generate a mitigation output that causes the one or more sensors, actuators and/or functions of the motor vehicle control system to actively, continuously, and manage vehicle performance in longitudinal and lateral acceleration, pitch, roll, and yaw regardless of ambient conditions and road surface conditions.

\* \* \* \* \*